United States Patent [19]
Hitchcock

[11] Patent Number: 5,868,449
[45] Date of Patent: Feb. 9, 1999

[54] AUXILIARY TAILBOARD ASSEMBLY FOR DROP-DOWN TAILGATE

[76] Inventor: Scott R. Hitchcock, 14420 Avocado, Florissant, Mo. 63034

[21] Appl. No.: 81,956

[22] Filed: May 19, 1998

[51] Int. Cl.$^6$ .................................................. B62D 25/00
[52] U.S. Cl. ..................... 296/57.1; 296/26.02; 296/26.1
[58] Field of Search ............................... 296/57.1, 26.04, 296/26.05, 26.06, 26.08, 26.09, 26.1, 26.02

[56] References Cited

U.S. PATENT DOCUMENTS

| | | | |
|---|---|---|---|
| 1,953,084 | 4/1934 | Lim | 296/26 |
| 2,712,470 | 7/1955 | Cardini | 296/26 |
| 2,729,499 | 1/1956 | Eqqum | 296/26 |
| 4,023,850 | 5/1977 | Tillery | 296/26 |
| 4,472,639 | 9/1984 | Bianchi | 296/26 |
| 4,531,773 | 7/1985 | Smith | 296/26 |
| 4,778,213 | 10/1988 | Palmer | 296/26 |
| 4,889,378 | 12/1989 | Sims | 296/57.1 |
| 4,932,703 | 6/1990 | Chamberlin et al. | 296/26 |
| 5,456,511 | 10/1995 | Webber | 296/26 |
| 5,468,038 | 11/1995 | Sauri | 295/57.1 |
| 5,478,130 | 12/1995 | Matulin et al. | 296/57.1 |
| 5,501,500 | 3/1996 | Cannon | 296/26 |

*Primary Examiner*—Joseph D. Pape
*Attorney, Agent, or Firm*—Grace J. Fishel

[57] ABSTRACT

An auxiliary tailboard assembly for attachment to a drop-down tailgate that allows a user to bring the tailboard into vertical position, confining a load to the tailgate, after the goods have been loaded on the tailgate. The tailboard assembly includes a case for attachment to an inside face of the tailgate and a panel which can be extended and retracted in the case. A slot is provided into which the panel is seated when the panel is extended and rotated into vertical position and a stop for preventing removal of the panel from either the case or slot.

10 Claims, 4 Drawing Sheets

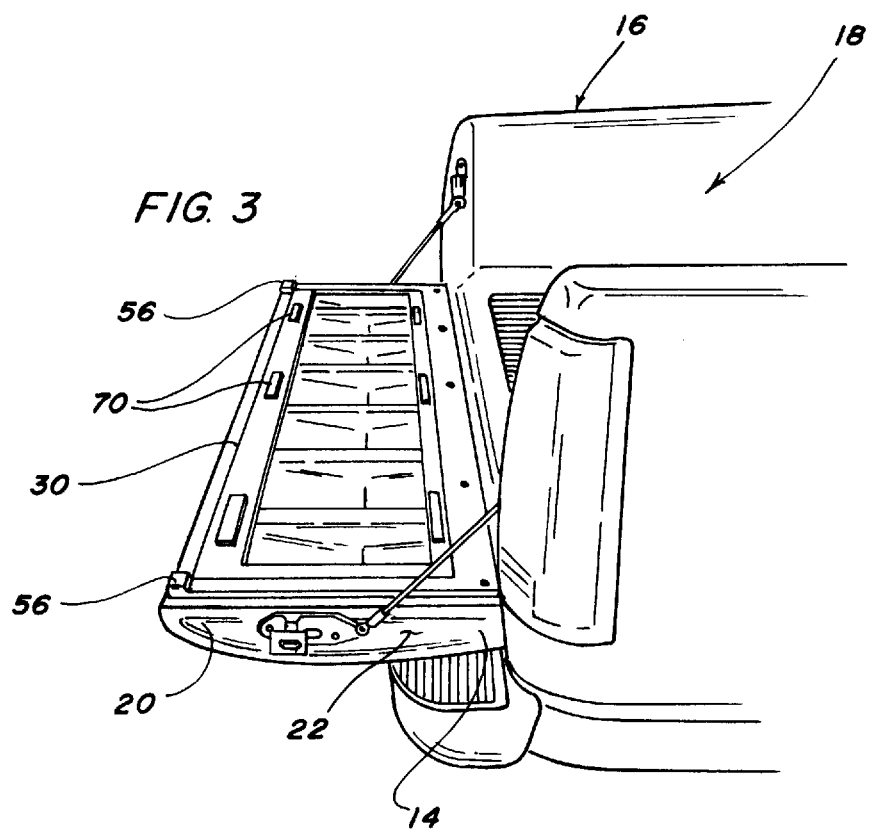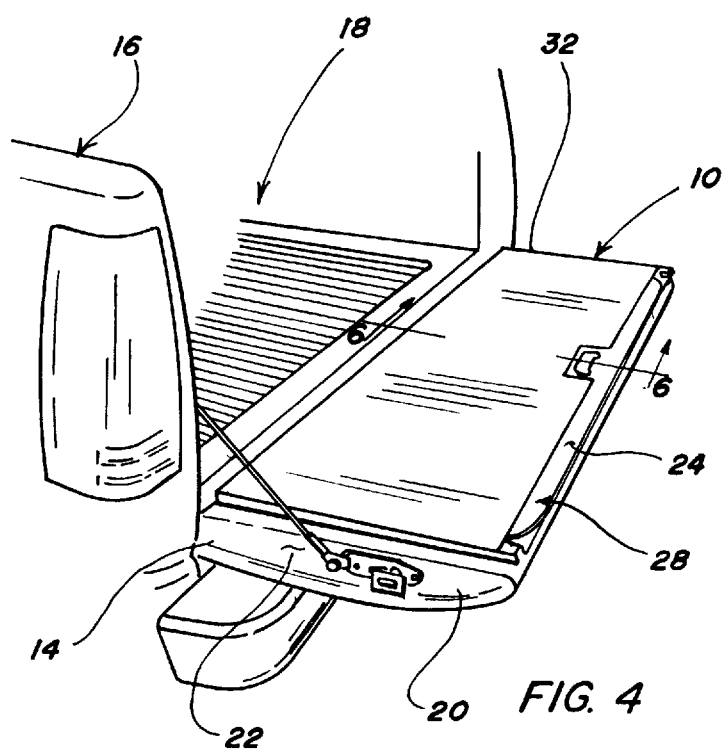

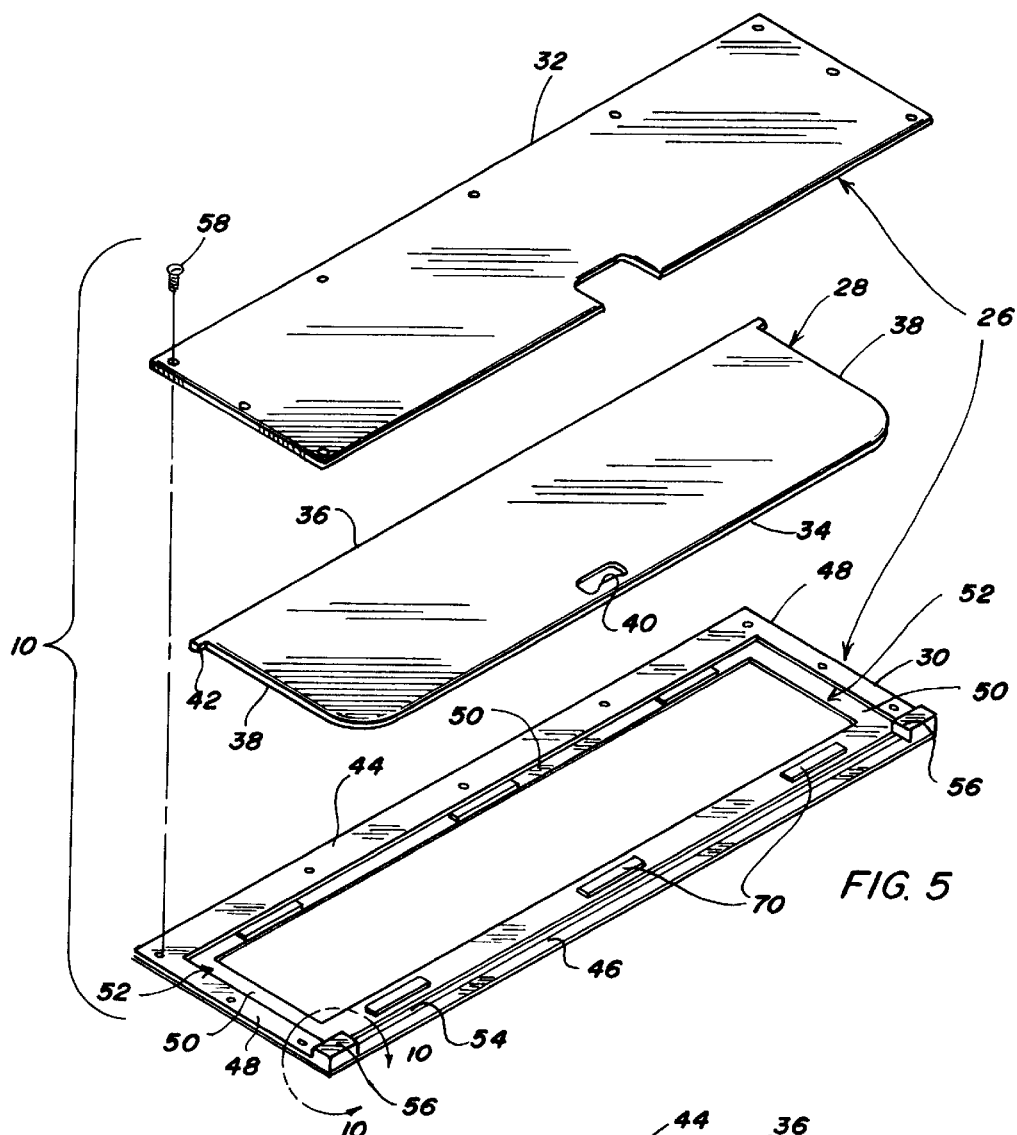
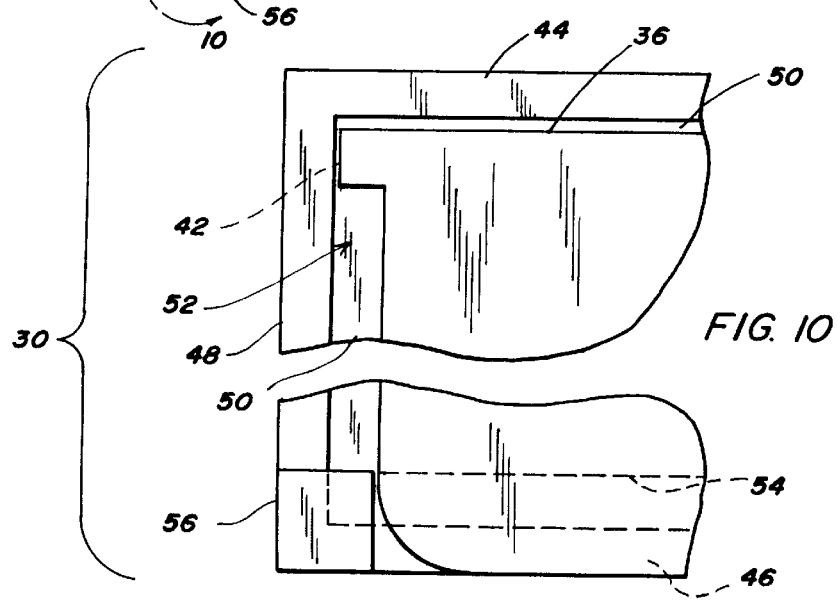

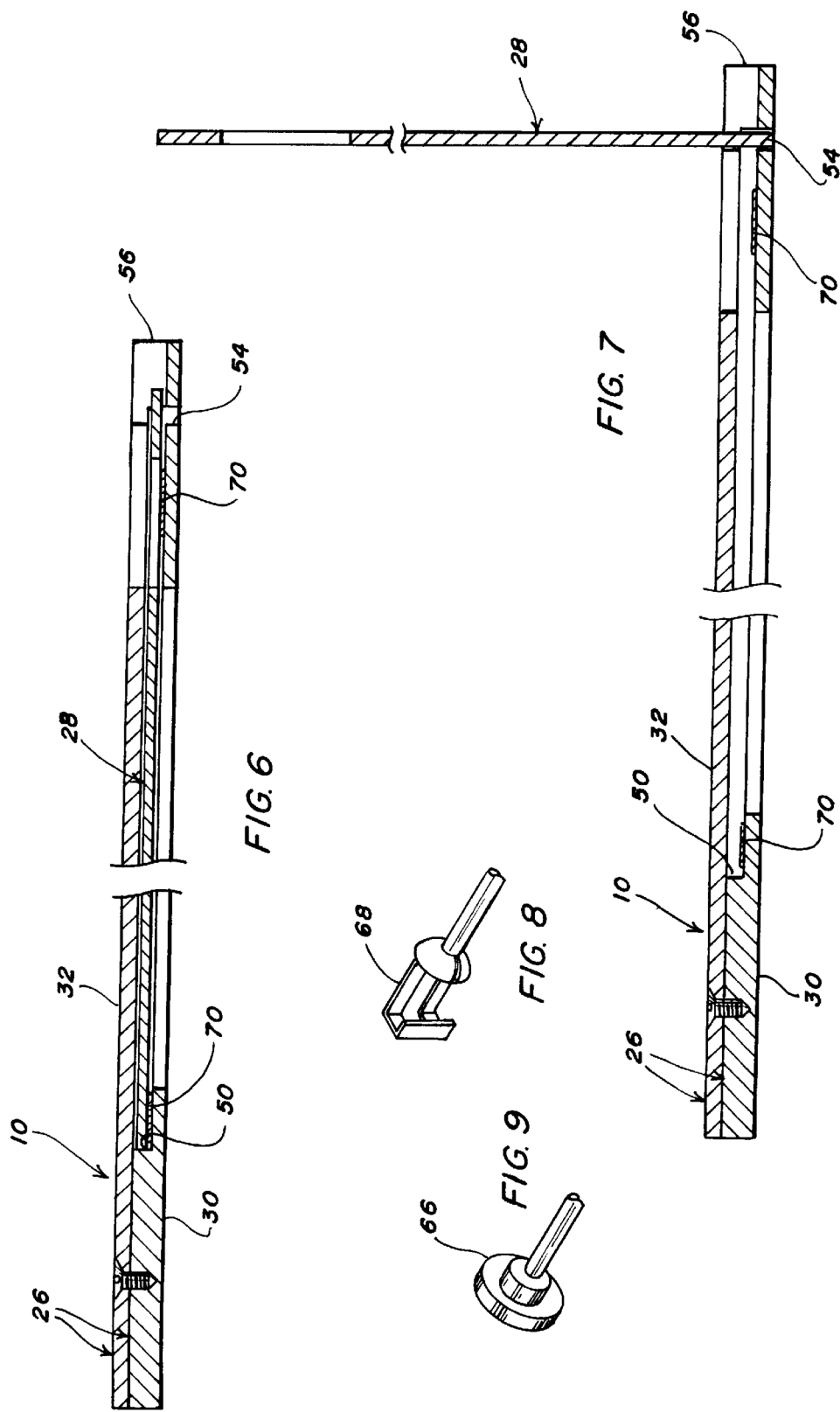

AUXILIARY TAILBOARD ASSEMBLY FOR DROP-DOWN TAILGATE

BACKGROUND OF THE INVENTION

1. Field of the Invention

The present invention relates to an auxiliary tailboard assembly for a drop-down tailgate that can be brought into vertical position to confine a load on the tailgate after the goods have been loaded.

2. Brief Description of the Prior Art

Pickup trucks and other vehicles such as station wagons and some sport utility vehicles have a bed for carrying a load and a drop-down tailgate for retaining the load on the bed. Such vehicles are used to carry a wide variety of objects, such as furniture, appliances, lumber, tools and other bulky items. There are often times when the length of the load is greater than the length of the vehicle bed. In such a case, the tailgate may be left in a lowered or horizontal position to accommodate the longer load. When the tailgate is in the lowered position, however, the load is no longer confined by the tailgate and there is a possibility that the load may roll out and become lost, in addition to creating a hazard for other vehicles that follow behind.

There are many attachments proposed for extending the length of a vehicle bed. Some of them have panels that slide or fold out from the tailgate or from the truck bed for extending the effective length of the tailgate. Others provide panels that do not extend the length of the tailgate but are hinged along the top edge of the tailgate, providing an auxiliary tailboard. The attachments described in U.S. Pat. Nos. 5,501,500, 5,468,038, 5,456,511, 5,478,130, 4,932,703, 4,889,378, 4,778,213, 4,531,773, 4,472,639, 4,023,850, 2,729,499, 2,712,470 and 1,953,084 are representative of the prior art. The patents describe attachments that require the user to fold out the attachment before the goods are loaded as the load otherwise gets in the way of using the attachment. Some of the attachments extend the vehicle bed but do not confine the goods at the rear. Those that are pivoted to the top edge of the tailgate with a piano hinge or a pair of pivot pins may shear under load if the vehicle accelerates quickly or if the goods roll.

What is needed is an attachment for a tailgate, with excellent strength and rigidity, that allows a user to bring an auxiliary tailboard into vertical position after the goods are loaded, as an afterthought, if required.

BRIEF SUMMARY OF THE INVENTION

In view of the above, it is an object of the present invention to provide an auxiliary tailboard assembly that satisfies the above-mentioned needs. Other objects and features of the invention will be in part apparent and in part pointed out hereinafter.

In accordance with the invention, an auxiliary tailboard assembly is provided for use on a drop-down tailgate having a proximal end connected to a vehicle, a distal end opposite to the proximal end and right and left lateral sides. The tailboard assembly has a flat rectangular panel and a case forming the inside surface of the tailgate. The panel has a trailing end, a leading end opposite the trailing end and right and left lateral ends. A pin is provided in each lateral end of the panel at the trailing end and the case has a pair of opposing elongated guides for attachment at the lateral ends of the tailgate. Each of the guides has a proximal end and distal end and a recess within which the pins of the panel slide. A slot is located at the distal end of the guides within which the trailing end of the panel pivots and can be seated. The panel is movable between a retracted position and an extended position with respect to the tailgate by sliding the panel generally horizontally in the guides even after a load has been placed on the tailgate. The panel can be extended, rotated about the trailing end and seated in the slot in a generally vertical position forming a tailboard for confining the load on the tailgate.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which:

FIG. 3 is a perspective side view of a frame portion of the tailboard assembly on a pickup truck;

FIG. 4 is a perspective side view of the tailboard assembly shown in FIG. 1 but with the auxiliary tailboard in retracted position;

FIG. 5 is an exploded, perspective view of the tailboard assembly;

FIG. 6 is a sectional view taken along line 6—6 in FIG. 4;

FIG. 7 is a sectional view taken along line 7—7 in FIG. 2;

FIG. 8 is a perspective view of a button fastener;

FIG. 9 is a perspective view of a hook; and,

FIG. 10 is a detail, in plan, taken along line 10—10 in FIG. 5.

DETAILED DESCRIPTION OF THE INVENTION

Figure 1:
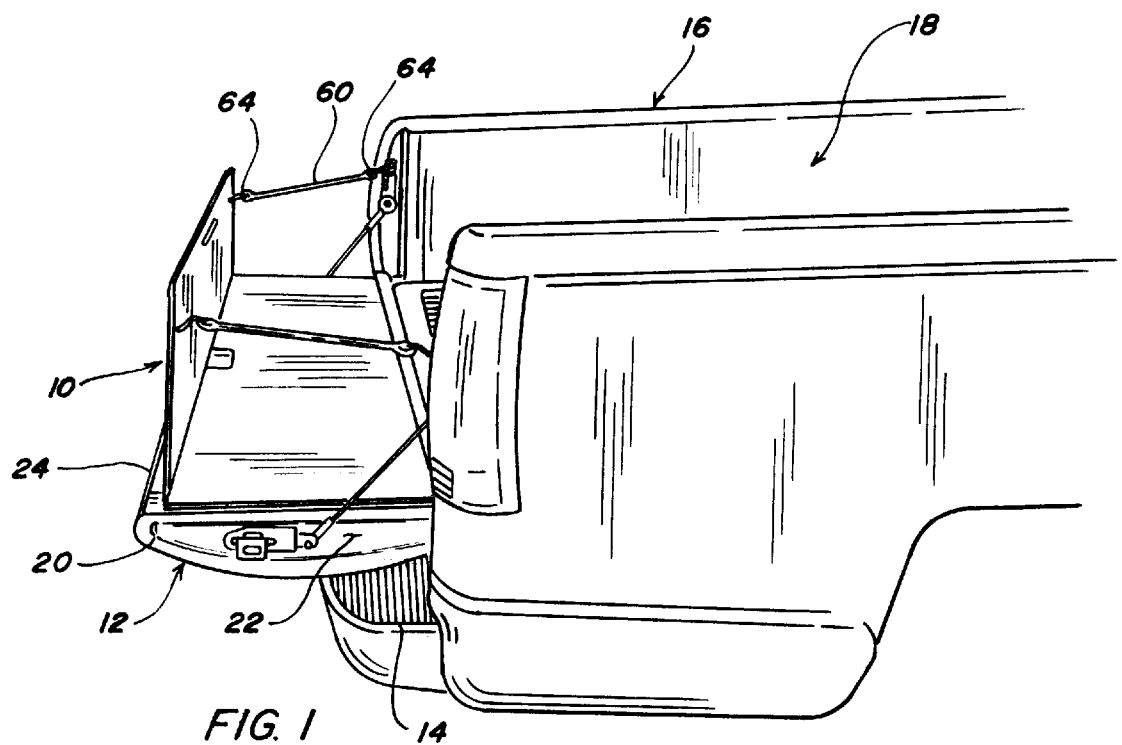
FIG. 1 is perspective side view of an auxiliary tailboard assembly in accordance with the present invention on a pickup truck with a drop-down tailgate and with the auxiliary tailboard in extended, vertical position.

Referring to the drawings more particularly by reference numeral, reference character 10 refers to an auxiliary tailboard assembly in accordance with the present invention. In the form illustrated in the drawings, tailboard assembly 10 is adapted for installation on a pre-existing drop-down tailgate 12, fitting within the margins of the tailgate such that it does not interfere with the normal opening and closing of the gate. Tailboard assembly 10 may also be installed on a tailgate as original equipment, in the same manner as a pre-existing tailgate, or may be incorporated into the design of the tailgate as more particularly described below.

With continuing reference to the drawings, tailgate 12 has a proximal end 14 connected to a vehicle 16, such as a truck, station wagon, sport utility vehicle or the like with a bed 18 for carrying a load. Tailgate 12 has a distal end 20, opposite proximate end 14, forming a top edge of the tailgate, right and left lateral sides 22, and an inside face 24 which encloses the rear end of vehicle bed 18 when the gate is closed.

Figure 2:
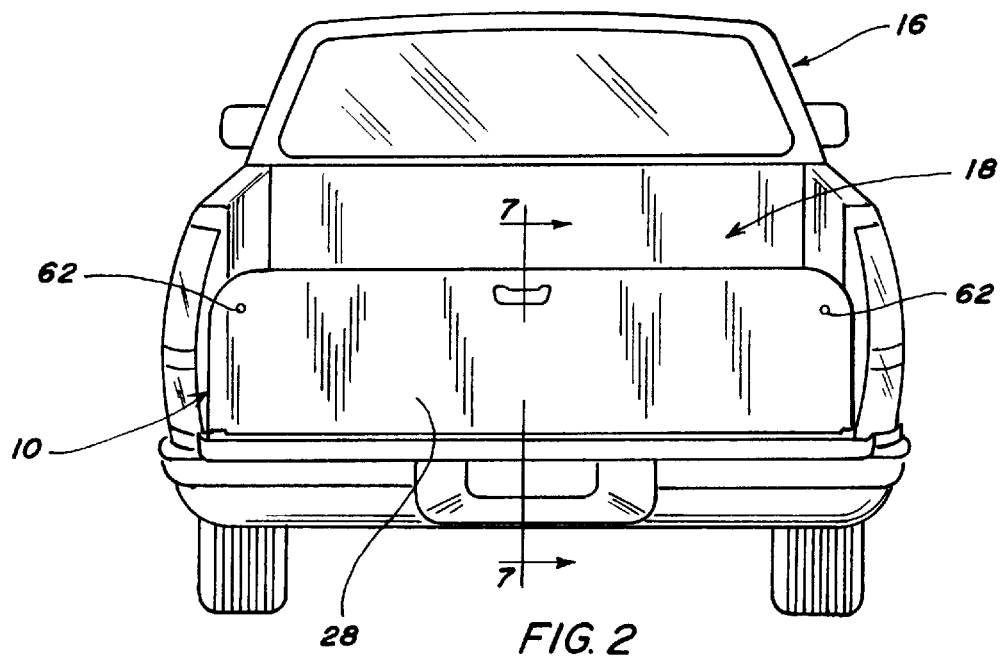
FIG. 2 is a rear view of the tailboard assembly shown in FIG. 1 on a pickup truck.

Tailboard assembly 10 includes a case 26 attached to inside face 24 of tailgate 12 and a flat rectangular panel 28. Case 26 includes a frame 30 adapted to be mounted on inside face 24 and a cover plate 32 upon which goods may be loaded when tailgate 12 is down. Plate 32 covers panel 28 which is mounted in frame 30 for reciprocation between a retracted position as shown in FIG. 4 and an extended, upright position as shown in FIGS. 1–2.

As best seen in FIG. 5, panel 28 has a leading end 34, a trailing end 36 and right and left lateral ends 38. A handhold 40 may be provided at leading end 34 for extending and retracting panel 28 as more particularly described hereinafter. A projection which may take the form of a pin 42 is provided in each lateral end 38 at the trailing end of the panel. Frame 30 is generally rectangular with a proximal side 44, distal side 46, opposite the proximal side 44, and right and left lateral sides 48. Cover plate 32 is recessed in a top surface of frame 30. Proximal side 44 and right and left lateral sides 48 are rabetted 50 and distal side 46 made level with rabbets 50 for sliding receipt of panel 28. Rabbets 50 in right and left lateral sides 48 with cover plate 32 form a pair of opposing elongated guides 52 with a recess within which pins 42 of panel 28 slide. At a proximal end of guides 52, the retraction of panel 28 is stopped, as best seen in broken lines in FIG. 10, when it makes contact with a vertical sidewall of rabbet 50 in proximal side 44 of frame 30. A slot 54 is provided at a distal end of guides 52, perpendicular to the longitudinal axis of the guides, within which the trailing end of panel pivots and is seated. A stop 56 bridging slot 54 is positioned at the distal end of guides 52. Stop 56 prevents pins 42 from sliding past the slot, stopping the extension of panel 28 horizontally and preventing its accidental removal from case 26. Stop 56 also prevents the removal of panel 28 from slot 54 vertically.

Case 26 and panel 28 are preferably made from aluminum as aluminum is strong but light and resistant to rust as compared to steel. Pins (e.g., projections) 42 and stop 56, however, may be formed of steel for increased strength.

When tailboard assembly 10 is installed in tailgate 12 as original equipment, use may be made of the inner and outer walls of a conventional tailgate to enclose tailboard assembly 10 in the stored position. As will be readily understood by those skilled in the art, inner wall may be adapted for use as cover plate 32 and outer wall may be adapted for use as frame 30. Guides 52, slot 54 and bridging stop 56 are present in this modified form in the space enclosed by the inner and outer walls, while an opening is provided in top edge 20 of the tailgate through which panel 28 is reciprocated.

In use, case 26 is attached to inside face 24 of tailgate 12 with screws 58, a representative one of which is shown in FIG. 5, where the case has substantially no effect on the load carrying capacity of bed 18. Cover plate 32 shields panel 28 from any goods on tailgate 12 so that panel 28 can be extended from case 26, after the vehicle is loaded, and set into vertical position as an auxiliary tailboard. A linkage 60 such as a bungee cord, chain or the like may be provided between distal end of panel 28 and a vertical point of attachment on the rear of vehicle 16 for the purpose of stabilizing the upper end of the panel. Panel 28 may be provided with holes 62 as shown in FIG. 2 for connection with linkage 60 through a pair of hooks 64 as shown in FIG. 1 or with a button 66 and hook 68 combination as shown in FIGS. 8–9. Gravity holds panel 28 seated in slot 54, while slot rigidly braces panel 28.

When panel 28 is no longer needed as a tailboard, panel 28 is easily and quickly retracted by lifting it upward until pins 42 make contact with bridging stop 56, whereupon panel 28 can be rotated about trailing end 36 into generally horizontal position and slid back into case 26. When case 26 and panel 28 are made of aluminum or some other lightweight material, tailboard assembly 10 does not impede the normal operation of the tailgate. When tailgate 12 is closed, gravity holds panel 28 seated in rabbet 50 on proximal side 44 of frame 30. Elastomeric pads 70 may be provided on the upper surface of frame 30 and on inside surface of cover plate 32 to keep panel 28 from rattling in case 26.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. An auxiliary tailboard assembly for a drop-down tailgate having a proximal end connected to a vehicle, a distal end opposite to the proximal end and right and left lateral sides, said auxiliary tailboard comprising a flat rectangular panel and a case forming the inside surface of the tailgate, said panel has a trailing end, a leading end opposite the trailing end and right and left lateral ends, a pin in each lateral end of the panel at the trailing end, said case having a pair of opposing elongated guides for attachment at the sides of the tailgate, each of said guides having a proximal end and a distal end and a recess within which the pins of the panel slide, and a slot at the distal end of the guides within which the trailing end of the panel pivots and can be seated whereby the panel is movable between a retracted position and an extended position with respect to the tailgate by sliding the panel generally horizontally in the guides even after a load has been placed on the tailgate and whereby the extended panel can be rotated about the trailing end and seated in the slot in a generally vertical position helping to confine the load on the tailgate.

2. The tailboard assembly of claim 1 wherein the case is a frame with a cover plate, said frame having a proximal side, distal side and lateral sides, said proximal side and lateral sides rabetted for sliding receipt of pins and proximal side, respectively, said rabbets in the lateral sides with cover plate forming the guides, said distal side level with the rabbets in distal slide and later sides for sliding receipt of the panel.

3. The tailboard assembly of claim 1 wherein a stop bridges the slot and prevents the panel from sliding out of the case and from being lifted out of the slot.

4. The tailboard assembly of claim 2 wherein the frame and panel are formed of aluminum.

5. The tailboard assembly of claim 3 wherein the stop and the pins are formed of steel.

6. An auxiliary tailboard assembly for a drop-down tailgate having a proximal end connected to a vehicle, a distal end opposite to the proximal end and right and left lateral sides, said auxiliary tailboard comprising a flat rectangular panel and a case forming the inside surface of the tailgate, said panel having a trailing end, a leading end opposite the trailing end and right and left lateral ends and a pin in each lateral end of the panel at the trailing end, said case having a frame with a cover plate, said case having a frame with a proximal side, distal side and lateral sides, said proximal side and lateral sides rabetted, said rabetted lateral sides together with the cover plate forming a pair of opposing guides for sliding receipt of pins, said distal side of the frame level with the rabbets in proximal and lateral sides for sliding receipt of the panel, each of said guides having a proximal end and a distal end, a slot at the distal end of the guides within which the trailing end of the panel pivots and can be seated whereby the panel is movable between a retracted position and an extended position with respect to the tailgate by sliding the panel generally horizontally in the guides even after a load has been placed on the tailgate and whereby the extended panel can be rotated about the trailing end and seated in the slot in a generally vertical position helping to confine the load on the tailgate.

7. The tailboard assembly of claim 1 wherein a stop bridges the slot and prevents the panel from sliding out of the frame and from being lifted out of the slot.

8. The tailboard assembly of claim 7 wherein the frame and panel are formed of aluminum.

9. The tailboard assembly of claim 8 wherein the stop and the pins are formed of steel.

10. The tailboard assembly of claim 7 wherein a linkage is connected to the vehicle for stabilizing the leading end of the panel.

* * * * *